(12) United States Patent
Wang et al.

(10) Patent No.: US 10,809,701 B2
(45) Date of Patent: Oct. 20, 2020

(54) NETWORK ADAPTED CONTROL SYSTEM

(71) Applicant: Mitsubishi Electric Research Laboratories, Inc., Cambridge, MA (US)

(72) Inventors: Yebin Wang, Cambridge, MA (US); Yehan Ma, Cambridge, MA (US); Philip Orlik, Cambridge, MA (US); Toshiaki Koike-Akino, Belmont, MA (US); Jianlin Guo, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 67 days.

(21) Appl. No.: 16/218,900

(22) Filed: Dec. 13, 2018

(65) Prior Publication Data

US 2020/0192336 A1 Jun. 18, 2020

(51) Int. Cl.
| | |
|---|---|
| *G05B 19/418* | (2006.01) |
| *G05B 13/04* | (2006.01) |
| *G05B 19/045* | (2006.01) |
| *H04L 29/08* | (2006.01) |

(52) U.S. Cl.
CPC ....... *G05B 19/4185* (2013.01); *G05B 13/042* (2013.01); *G05B 19/045* (2013.01); *G05B 19/41835* (2013.01); *H04L 67/12* (2013.01)

(58) Field of Classification Search
CPC .......... G05B 19/4185; G05B 19/41835; G05B 13/042; G05B 19/045
USPC .......................................................... 700/29
See application file for complete search history.

(56) References Cited

U.S. PATENT DOCUMENTS

| | | | | |
|---|---|---|---|---|
| 4,792,888 A * | 12/1988 | Agarwal | ............ | G05B 23/0216 700/83 |
| 6,256,983 B1 * | 7/2001 | Yasui | .................. | F02D 41/1403 123/674 |
| 2008/0120367 A1 * | 5/2008 | Thibault | ............ | G05B 19/4185 709/203 |

* cited by examiner

*Primary Examiner* — Chun Cao
(74) *Attorney, Agent, or Firm* — Gennadiy Vinokur; James McAleenan; Hironori Tsukamoto

(57) ABSTRACT

A control system for controlling a plant includes a local controller to generate local control commands according to a local control policy to control the plant and a receiver to received remote control commands generated by a remote controller to control the plant according to remote control policy. Local and remote control policies are designed for the same control objective and time resolution such that there is the same Lyapunov function having a negative definite time derivative for controlling the plant according to first or second control policies. The plant is controller with either remote or local control commands in dependence of a success of receiving a remote control command for a time step of the control.

20 Claims, 15 Drawing Sheets

NETWORK ADAPTED CONTROL SYSTEM

TECHNICAL FIELD

This invention relates generally to a control system, and more particularly to a networked control system adapted for controlling a plant with control commands received over networks.

BACKGROUND

A Networked Control System (NCS) is a control system wherein the control loops are closed through a communication network. The defining feature of an NCS is that control and feedback signals are exchanged among the system's components in the form of information packages through a network.

The NCS has an ability to connect cyberspace to physical space enabling the execution of several tasks from long distance. In addition, networked control systems eliminate unnecessary wiring reducing the complexity and the overall cost in designing and implementing the control systems. They can also be easily modified or upgraded by adding sensors, actuators and controllers with relatively low cost and no major changes in their structure. Moreover, featuring efficient sharing of data between their controllers, NCS are able to fuse global information to make intelligent decisions over large physical spaces.

Their potential applications are numerous and cover a wide range of industries such as: space and terrestrial exploration, access in hazardous environments, factory automation, remote diagnostics and troubleshooting, experimental facilities, domestic robots, aircraft, automobiles, manufacturing plant monitoring, nursing homes and tele-operations. While the potential applications of NCS are numerous, the proven applications are few, and the real opportunity in the area of NCS is in developing real-world applications that realize the area's potential.

Advent and development of the Internet combined with the advantages provided by NCS attracted the interest of researchers around the globe. Along with the advantages, several challenges also emerged giving rise to many important research topics. The insertion of the communication network in the feedback control loop makes the analysis and design of an NCS complex, since it imposes additional time delays in control loops or possibility of packages loss. Depending on the application, time-delays could impose severe degradation on the system performance.

To that end, practical NCS application use remote controllers cautiously. For example, a system described by Y. Tipsuwan and M.-Y. Chow, "Control methodologies in networked control systems," provides a remote controller only as a reference provider. Such a remote controller runs much slower than necessary for a stable control loops to provide reference inputs for optimal process operation. In addition, such a remote controller has insufficient authority to shape the transient of the closed-loop control system, and thus might cause performance loss.

To that end, there is still a need for a control system adapted to perform as NCS.

SUMMARY

It is an object of some embodiments to provide a control system suitable to accept control command over a network to enable networked control system (NCS). It is an object of one embodiment to provide such a control system that ensures a stable control of the plant even when some of control commands transmitted over the network are lost.

Some embodiments are based on recognition that a control signal can include a local controller configured to generate local control commands according to a local control policy to control a plant, while also adapted to receive, over a network, remote control commands generated by a remote controller to control the plant according to a remote control policy. In some embodiments, the remote and local controllers have the same control objective and operate on the same time scale, but flexible enough to have different control laws for achieving the objective. For example, a local control policy can have an analytical or a close solution, while the remote control policy can be more sophisticated to be solved by iterative procedures. Example of local control policy is PID control. Example of remote control policy as a model predictive control.

Some embodiments are based on realization, that two control policies having the same time scale and objective can be used interchangeably. For example, in some embodiments, if the control command from the remote controller is successfully delivered over the network, the received control command is used to control the plant. Otherwise, the local control command generated by the local controller is used.

To that end, the control system includes a switcher configured to switch controlling of the plant between controlling with the remote control commands and controlling with the local control commands in response to an event triggered by a change in a success of receiving a remote control command. Notably, the switcher switches the control back and forth between the local and remote controllers upon changing the success of network transmission. For example, as long as the network transmission of remote control commands is successful, the plant is controlled according to the remote control commands. If the transmission fails, and this failure is a change of the success of the transmission, the plant control is switched to the local control commands. As long as the transmission keeps failing, there is not change of success, so the plant is controlled by the local control commands. However, as soon as the remote control commands are again received, the change in a success of receiving a remote control command triggers the switch of the control to the controlling with remote control commands that will last as long as another change of success triggers the next switch of commands.

In such a manner, the switch between the remote and local control is not a recovery operation, but a normal behavior of a joint control. Notably the switching back and forth between local and remote control can happen rapidly, with potential frequency governed by time scale of control. Some embodiments are based on recognition that due to a possibility of a frequent switch between the remote and local controllers, such a joint control can become unstable even if control law of each of the controller guarantees stable control.

Some embodiments are based on realization that in order to provide such a system with potentially frequent control switch between the local and remote controllers, such local and remote controllers need to be jointly stable. Some embodiments are based on realization that to be jointly stable, the controllers should have a common Lyapunov function designed to have a negative definite time derivative for control policies of both controllers.

To that end, according to various embodiments, the local control policy and the remote control policy are designed for the same control objective and the same time resolution of controlling the plant such that there is the same Lyapunov function having a negative definite time derivative for controlling the plant according to the local control policy or controlling the plant according to the remote control policy.

Some embodiments are based on realization that to simplify the design of the local and remote controller having joint stability, the remote control policy needs to be adapted for the local control policy, and not vice versa. This is because the remote control policy is usually more sophisticated that the local control policy. Some embodiments are based on another realization that a single control policy can have multiple Lyapunov functions having a negative definite time derivative. Thus, for the same control policy, it is possible to design a Lyapunov function having a tunable parameter that can be tuned based on another control policy.

For example, for a model predictive control, a Lyapunov function is a cost function including a terminal cost and a stage cost. While the stage cost depends on the plant state and control commands, the terminal cost include a terminal matrix that can be tuned based on the local control policy. To that end, the problem of designing jointly stable controllers are reduced to a selection or optimization problem of how to select a tunable parameter of Lyapunov function of remote control policy such that the tuned Lyapunov function is also a Lyapunov function of a local control policy. Some embodiments solve this problem by enforcing a certain decay rate of the remote Lyapunov function of the remote control policy along a system trajectory corresponding to the local control policy to produce a value of a tunable parameter of the remote Lyapunov function. Some embodiments specify that the decay rate of the remote Lyapunov function along the system trajectory corresponding to the local control policy is at least not slower than the value given by evaluating the stage cost along the system trajectory at every time step.

Accordingly, one embodiment discloses a control system for controlling a plant, including a local controller configured to generate local control commands according to a local control policy to control the plant; a receiver configured to received remote control commands generated by a remote controller to control the plant according to a remote control policy, wherein the local control policy and the remote control policy are designed for the same control objective and the same time resolution of controlling the plant such that there is the same Lyapunov function having a negative definite time derivative for controlling the plant according to the local control policy or controlling the plant according to the remote control policy; and a switcher configured to switch controlling of the plant between controlling with the remote control commands and controlling with the local control commands in response to an event triggered by a change in a success of receiving a remote control command for a time step of the control.

Another embodiment discloses a method for controlling a plant, wherein the method uses a processor coupled with stored instructions implementing the method, wherein the instructions, when executed by the processor carry out steps of the method including generating local control commands according to a local control policy to control the plant, wherein the local control commands are identified by time steps of control; receiving, over a network, remote control commands generated by a remote controller to control the plant according to a remote control policy, wherein the remote control commands are identified by the time steps of control, and wherein the local control policy and the remote control policy are designed for the same control objective and the same time resolution of controlling the plant such that there is the same Lyapunov function having a negative definite time derivative for controlling the plant according to the first control policy or controlling the plant according to the second control policy; selecting a control command for controlling the plant for a time step of control, wherein the control command for the time step of control is either a remote control command for the time step of control, when the remote control command for the time step of control is received over the network, or a local control command for the time step of control; and submitting the control command stored in the buffer for the time step of control to an actuator of the plant for controlling the plant at the time step of control.

Yet another embodiment discloses a non-transitory computer readable storage medium embodied thereon a program executable by a processor for performing a method, the method includes generating local control commands according to a local control policy to control the plant, wherein the local control commands are identified by time steps of control; receiving, over a network, remote control commands generated by a remote controller to control the plant according to a remote control policy, wherein the remote control commands are identified by the time steps of control, and wherein the local control policy and the remote control policy are designed for the same control objective and the same time resolution of controlling the plant such that there is the same Lyapunov function having a negative definite time derivative for controlling the plant according to the first control policy or controlling the plant according to the second control policy; selecting a control command for controlling the plant for a time step of control, wherein the control command for the time step of control is either a remote control command for the time step of control, when the remote control command for the time step of control is received over the network, or a local control command for the time step of control; and submitting the control command stored in the buffer for the time step of control to an actuator of the plant for controlling the plant at the time step of control.

DETAILED DESCRIPTION

Figure 1A:
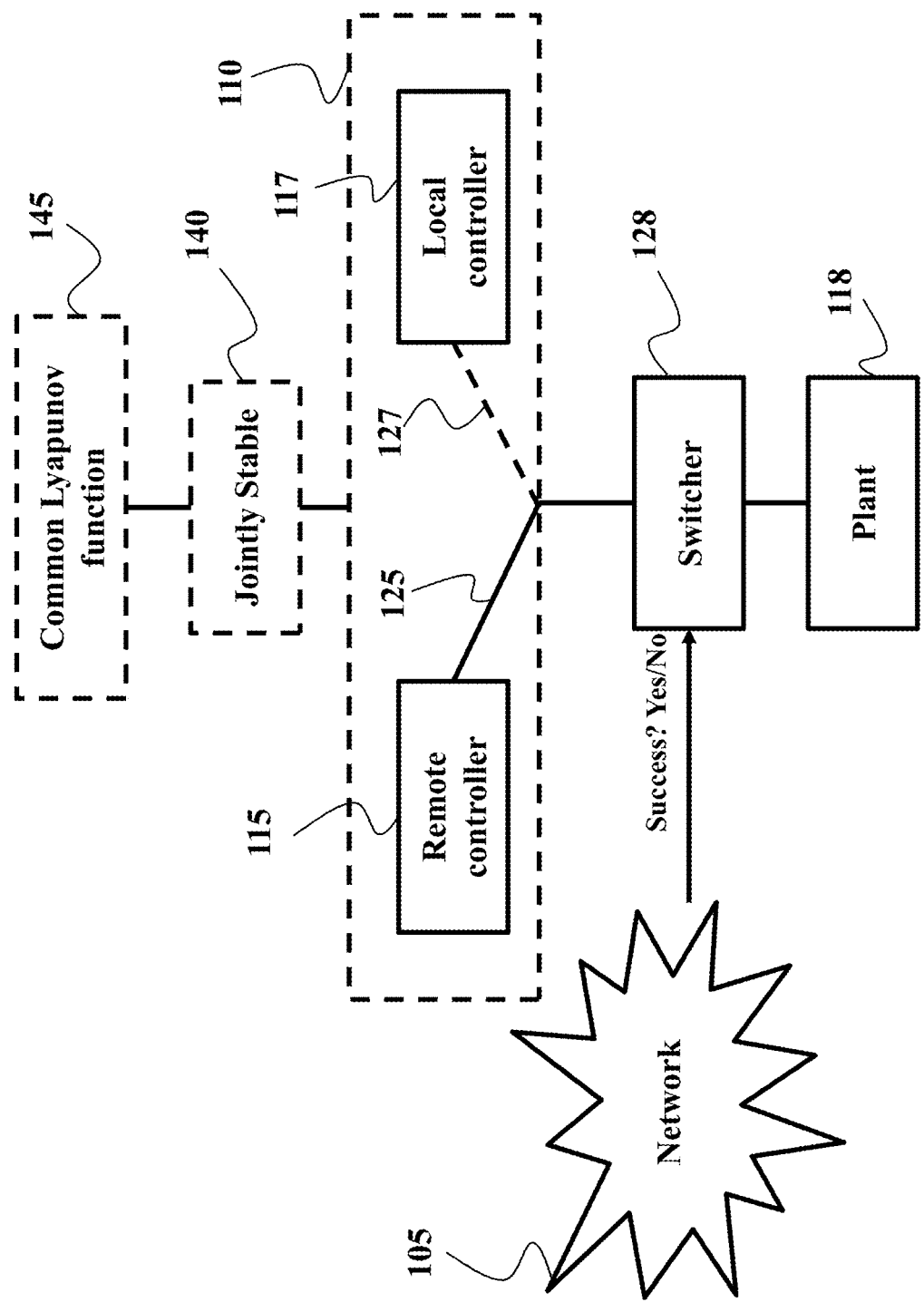
FIG. 1A shows a control system suitable to accept control command over a network to enable networked control system (NCS) according to some embodiments.

FIG. 1A shows a control system suitable to accept control command over a network 105 to enable networked control system (NCS) according to some embodiments. Some embodiments are based on recognition that a control system can include a local controller 117 configured to generate local control commands according to a local control policy to control a plant, while also adapted to receive, over a network 105, remote control commands generated by a remote controller 115 to control the plant according to a remote control policy. The remote and local controllers have the same control objective and operate on the same time scale, but flexible enough to have different control laws for achieving the objective. For example, a local control policy can have an analytical or a closed form, equivalently expressed by a certain function, while the remote control policy can be more sophisticated to be solved by iterative optimization procedures. Example of local control policy is PID control. Example of remote control policy as a model predictive control.

Some embodiments are based on realization, that two control policies having the same time scale and objective can be used interchangeably 110. For example, in some embodiments, if the control command from the remote controller is successfully delivered over the network 105, the received remote control command is used to control the plant. Otherwise, the local control command generated by the local controller is used. In effect, the control system of FIG. 1A ensures control of the plant 118 even when some of control commands transmitted over the network are lost.

To that end, the control system includes a switcher 128 configured to switch controlling of the plant 118 between controlling with the remote control commands 125 and controlling with the local control commands 117 in response to an event triggered by a change in a success of receiving a remote control command. The switcher 128 switches the control back and forth between the local and remote controllers upon changing the success of network transmission. For example, as long as the network transmission of remote control commands is successful, the plant is controlled according to the remote control commands. If the transmission failed, and this failure is a change of the success of the transmission, the plant control is switched to the local control commands. As long as the transmission keeps failing, there is not change of success, so the plant is controlled by the local control commands. However, as soon as the remote control commands are again received, the change in a success of receiving a remote control command triggers the switch of the control to the controlling with remote control commands that will last as long as another change of success triggers the next switch of commands.

In such a manner, the switch between the remote and local control is not a recovery operation, but a normal behavior of a joint control 110. Notably the switching back and forth between local and remote control can happen rapidly, with potential frequency governed by time scale of control. Some embodiments are based on recognition that due to a possibility of a frequent switch between the remote and local controllers, such a joint control can become unstable even if control law of each of the controller guaranties stable control.

Some embodiments are based on realization that in order to provide such a system with potentially frequent control switch between the local and remote controllers, such local and remote controllers need to be jointly stable 140. Some embodiments are based on realization that to be jointly stable, the controllers should have a common Lyapunov function 145 designed to have a negative definite time derivative for control policies of both controllers.

To that end, according to various embodiments, the local control policy 117 and the remote control policy 115 are designed for the same control objective and the same time resolution of controlling the plant such that there is the same Lyapunov function having a negative definite time derivative for controlling the plant according to the local control policy or controlling the plant according to the remote control policy. In effect, the joint stability of the control system of FIG. 1A ensures a stable control of the plant 118 even when some of control commands transmitted over the network are lost.

Figure 1B:
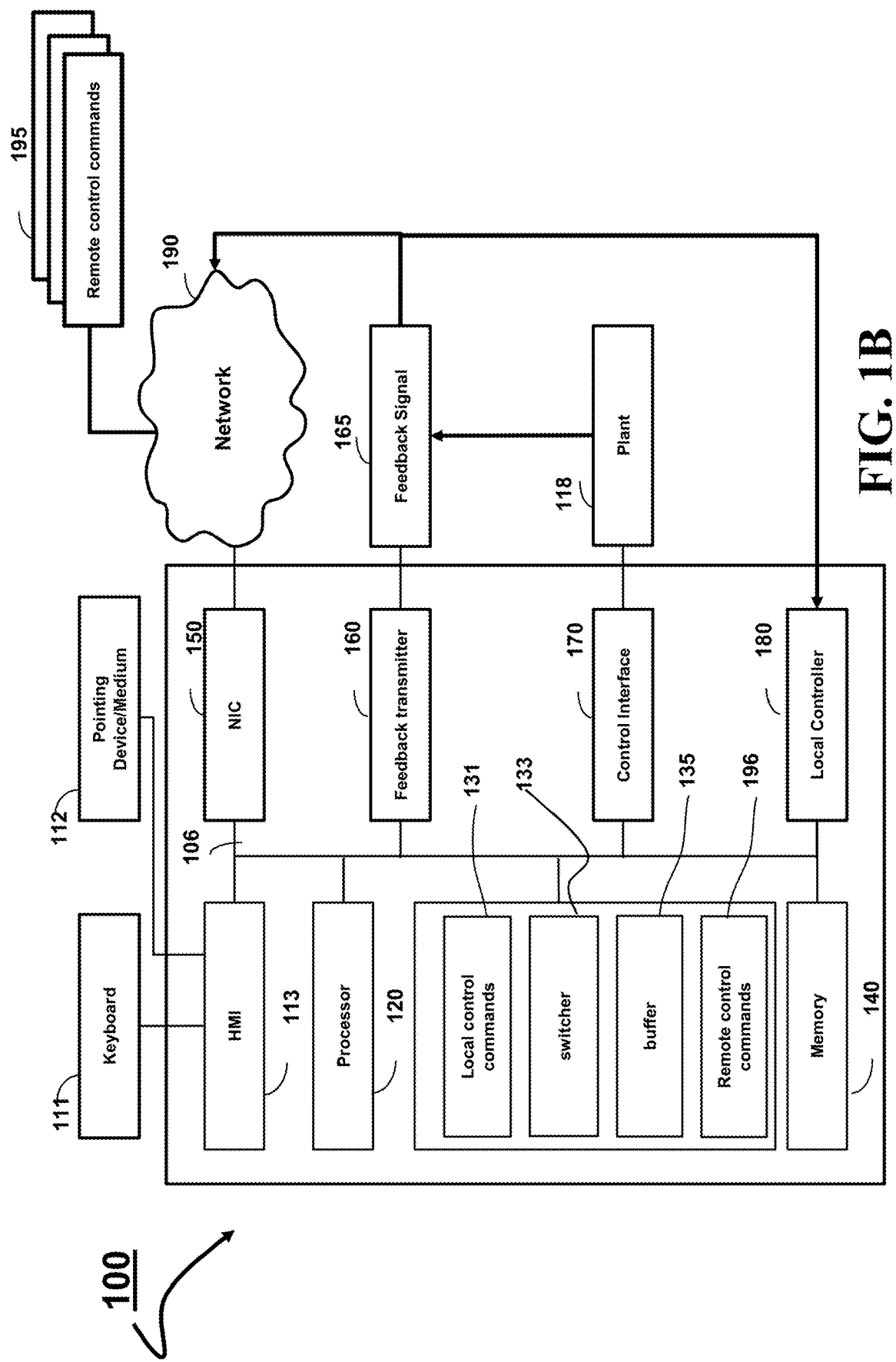
FIG. 1B shows a block diagram of a control system for controlling a plant performing an operation according to some embodiments.

FIG. 1B shows a block diagram of a control system 100 for controlling a plant performing an operation according to some embodiments. The components of the system 100 can vary for different configurations of the system 100. The components can be implemented as software components executed by a processor, hardware components, or combination thereof. The control system 100 can have a number of interfaces connecting the system 100 with other systems and devices. A network interface controller 150 is adapted to connect the system 100 through the bus 106 to a network 190 connecting the control system 100 with outputs of the remote controller, e.g., the remote controller 115. In some implementations, a human machine interface 113 within the system 100 connects the system to a keyboard 111 and/or pointing device 112, wherein the pointing device 112 can include a mouse, trackball, touchpad, joy stick, pointing stick, stylus, or touchscreen, among others.

Through the interface 113 or NIC 150, the system 100 can receive configuration values for controlling the plant. Examples of the configuration values include a local control policy for the local controller 180, control objectives for controlling the plant, reference trajectory for controlling the plant. The system 100 can include a feedback transmitter 160 to transmit the feedback signal 165 indicative of a state of a plant 118 as measured by one or multiple sensors (not shown). The system 100 can also be connected to a control interface 170 adapted to connect the system to actuators of the plant 118.

The system 100 includes a processor 120 configured to execute stored instructions, as well as a memory 140 that stores instructions that are executable by the processor. The processor 120 can be a single core processor, a multi-core processor, a computing cluster, or any number of other configurations. The memory 140 can include random access memory (RAM), read only memory (ROM), flash memory, or any other suitable memory systems. The processor 120 is connected through the bus 106 to one or more input and output devices. These instructions implement at least some components and/or steps of networked control system (NCS) method for controlling a plant.

To that end, the control system 100 includes a local controller 180 configured to generate local control commands 131 according to a local control policy to control the plant 118 and a receiver, e.g., NIC 150, configured to receive, over a network 190, remote control commands 195 generated by a remote controller to control the plant according to a remote control policy. The remote control commands 195 can be downloaded and stored 196 for further processing. To ensure stability, the local control policy and the remote control policy are designed for the same control objective and the same time resolution of controlling the plant such that there is the same Lyapunov function having a negative definite time derivative for controlling the plant according to the first control policy or controlling the plant according to the second control policy.

In some implementations, the system 100 includes a buffer 135, e.g., a sequence of memory cells and/or a data structure, configured to store a sequence of control commands for controlling the plant over a sequence of control steps. A control command for a time step of control is either a remote control command 196 for the time step of control or a local control command 131 for the time step of control, but not both. The control system 100 includes a switcher 133 operatively connected to the configured to place in the buffer the remote control command for the time step of control when the remote control command for the time step of control is successfully received, and, otherwise, place in the buffer the local control command for the time step of control. As referred herein, the remote control command for the time step of control is received successfully when the entire remote control command is received within a time window before the scheduled control execution time for the time step of control. In some implementations, the time step of control does not mean the actual time, but the order of execution of control commands. The successfully received command is received before the execution time dictated by the order of execution specified by the time step of control. The system 100 also includes a control interface 170 configured to submit the control command stored in the buffer for the time step of control to an actuator of the plant for controlling the plant at the time step of control.

In effect, the control interface submits to the actuators a remote control command if that remote control command is successfully received over the network, and otherwise, submit the local control command. Because the local control policy and the remote control policy are designed for the same control objective and the same time resolution of controlling the plant such that there is the same Lyapunov function, the remote and local control command can substitute each other without jeopardizing stability of the controlled plant. That allows taking advantage from sophistication of the remote control without disadvantages of latency and packet loss associated with the network transmission.

In some embodiments, the local control commands 131 and the remote control commands 196 are identified by time steps of control. The time steps of control ensure correspondence of the local and control commands, as well as order of placing the control commands in the buffer. For example, the time steps of control can correspond to a time instance of the feedback signal used to determine local and remote control commands. For example, if the remote and local control commands are determined based on a sample of a feedback signal at a time instance k, the remote and local control commands are identified as the remote and local control commands for the time step k. The subsequent control commands determined, for example, for a sample of the feedback signal at a time instance k+1 are identified as the remote and local control commands for the time step k+1.

Figure 1C:
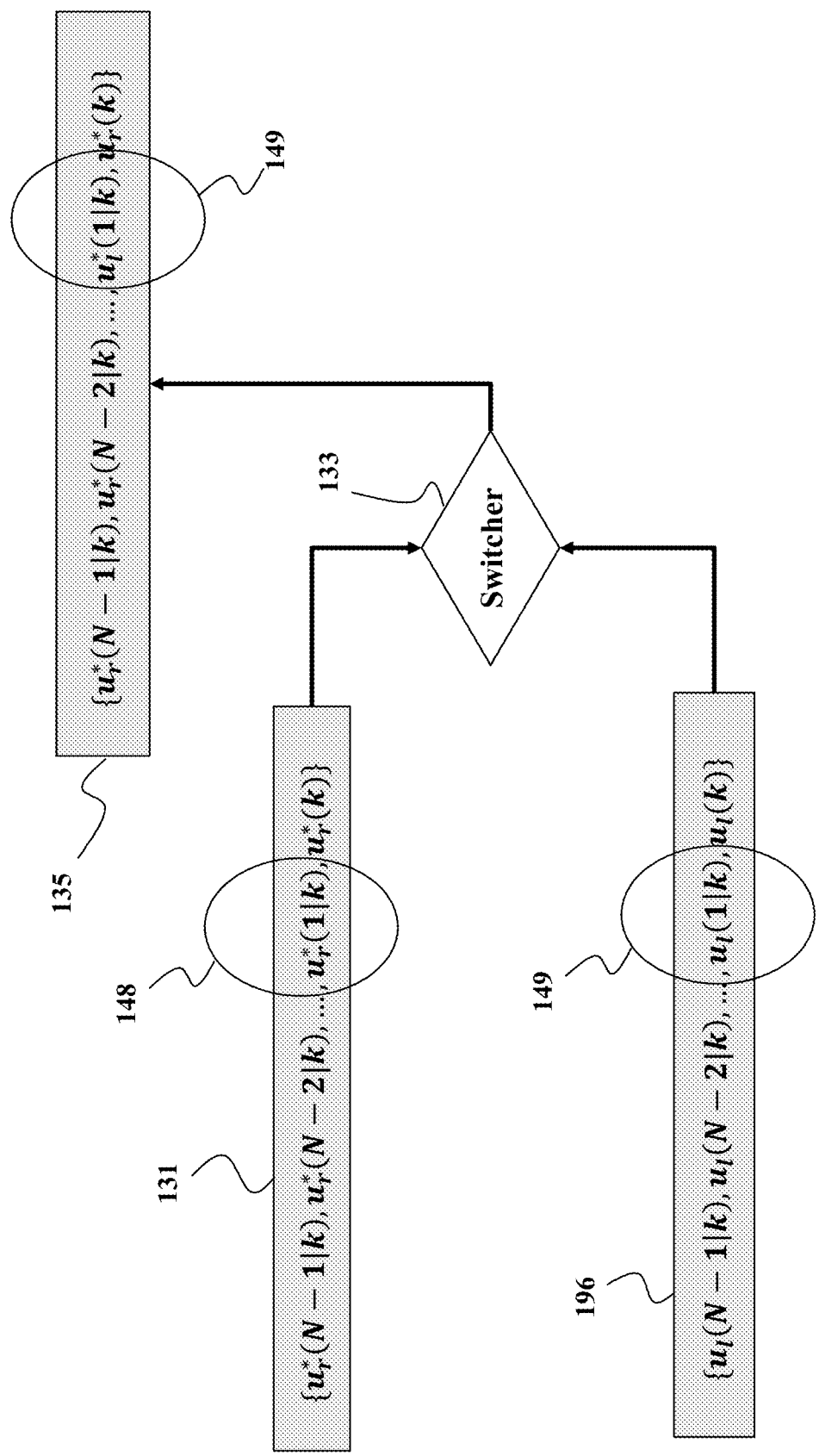
FIG. 1C shows a schematic of a method for forming a buffer according to some embodiments.

FIG. 1C shows a schematic of a method for forming a buffer according to some embodiments. The remote controller generates a sequence of remote control commands 131 and the local controller generates a sequence of remote control commands 133. For example, the sequences are generated based on feedback signal 165 independently from each other. The remote and local control commands are synchronized for the same control steps and/or based on the same samples of the feedback signal. For example, when the feedback transmitter 160 transmits a feedback signal 165 from the plant 168 to the local controller and to the remote controller, a sample of the feedback signal includes data indicative of a state of the plant at an instance of time. In addition, the feedback transmitter marks the sample of the feedback signal at the instance of time with an indication of the instance of time. The remote and the local controllers determine the remote and the local control commands for the same time step of control based on the same sample of the feedback signal. For example, a local control command 149 is determined for the same control step and/or based on the same sample of feedback signal as a remote control command 148.

In addition, the remote and the local control commands determined based on the sample of the feedback signal include the indication of the instance of time. Hence, if a transmission of a remote control command 148 fails, e.g., the remote control command 148 is not received within a specified window before the time step of control for this command, the switcher places the corresponding local control command 149 in the buffer 135.

The size of the buffer 135 can vary among different embodiments. For example, in one embodiment, the size of the buffer is one, e.g., buffer holds only a single control command. This embodiment takes advantage from the control commands generated based on the latest sample of feedback signal. For example, a remote controller can be a predictive controller generating a sequence of control commands for a predication horizon. However, in this embodiment, only a first control command is transmitted over the network to improve quality of control. This embodiment is particularly useful when customers have strong confidence on network performance, but less confidence on a model of the plant used to design control policies. In alternative embodiment, the buffer can include multiple values and remote controller can send the entire or part of the sequence of control commands generated for the prediction horizon over the network. This embodiment is based on understanding that network packet can include multiple control commands. In effect, packing multiple control commands into a single packet improves the throughput of the network used by NCS.

Figure 1D:
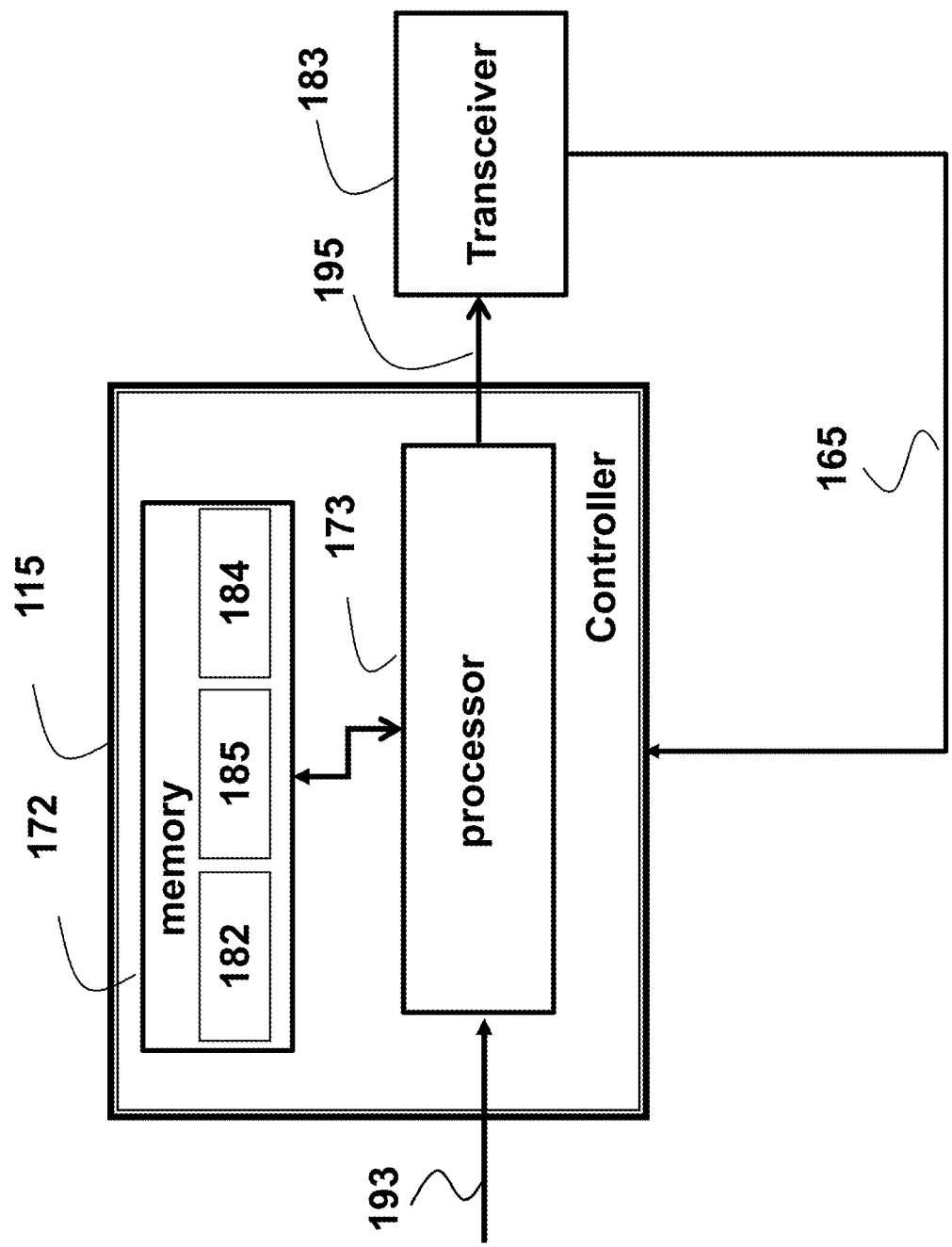
FIG. 1D shows a general structure of a remote controller according one embodiment.

FIG. 1D shows a general structure of a remote controller 115 according one embodiment. The remote controller 115 includes at least one processor 173 for executing modules of the controller. The processor 173 is operatively connected to a memory 172 for storing a model 182 of the plant 118, the cost function 185 defining the remote control policy and, optionally the constraints 184 on the operation of the plant. The remote controller 115 determines the remote control commands 195 using the remote control policy optimizing, using the model 182 and the state of the plant 165, the cost function 185 subject to constraints 184. For example, the remote control commands 195 can be determined to command the plant 118 to track a reference trajectory 193. The remote controller transmits the remote control commands 195 via a transceiver 183, and receives the feedback signal 165 measured by the sensors of the plant 118 and indicative of its state.

Figure 2A:
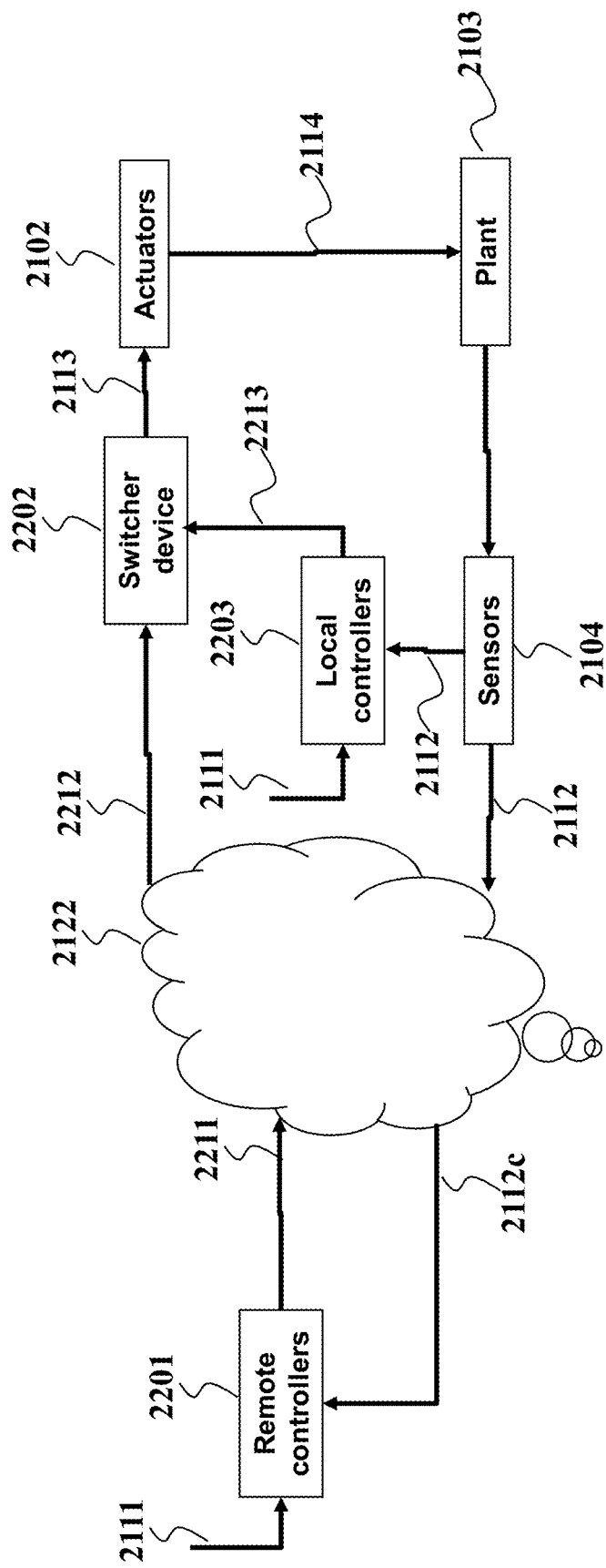
FIG. 2A and FIG. 2B show schematics of NCS for controlling a plant according to some embodiments.
Figure 2B:
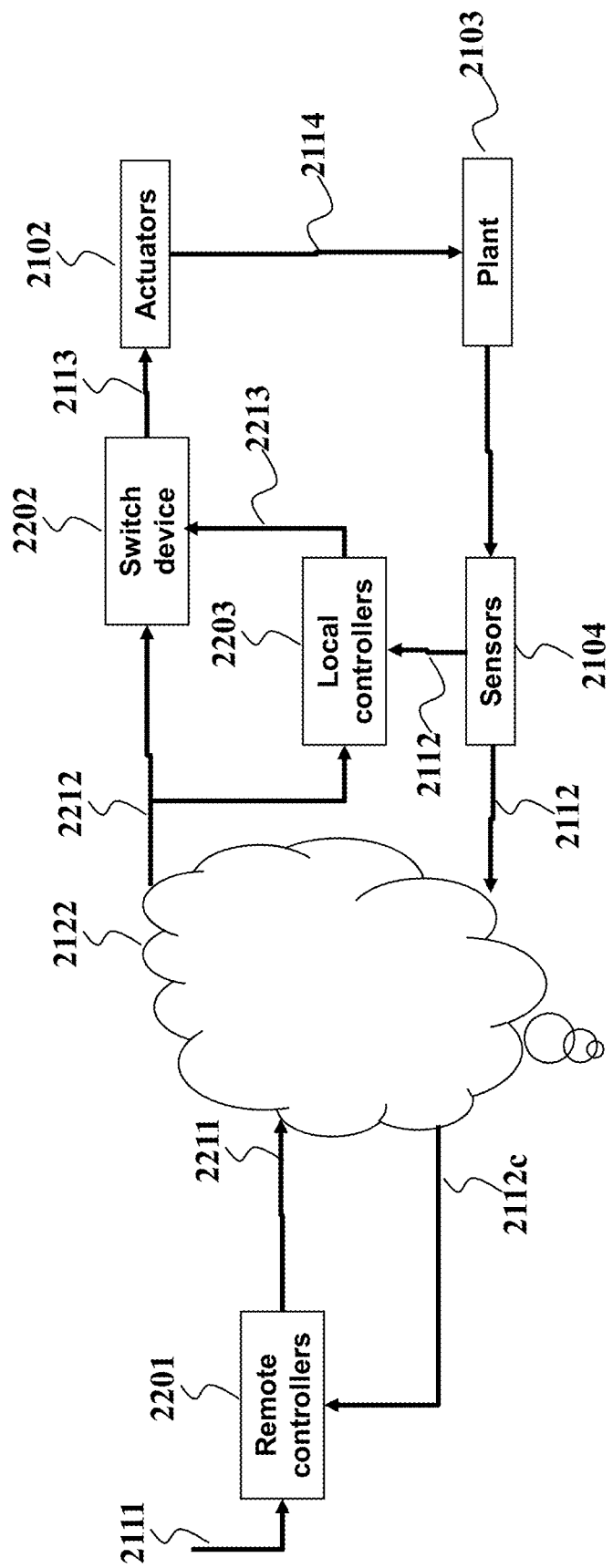

FIG. 2A and FIG. 2B show schematics of NCS for controlling a plant 2103 according to some embodiments. Let $\rho$ be a dummy variable. Given a constant $i \geq 0$, $\rho(i|k)$ denotes a prediction of $\rho(k+i)$, based on information available, for instance feedback signals, at time step k; and ρ(i|k+1) represents a prediction ρ(k+i+1), using the information available at time step k+1. For brevity, ρ(k)=ρ(0|k). At time step k, the remote controller determines 2201 a remote control packet 2211 based on reference 2111 and feedback signal 2112*c* which is communicated over a network 2122, and then hands the packet over to the network for delivery to a switch device 2202. The network 2122 is subject to many uncertainties such as computation time, communication time, randomness in load and interference from other receivers/transmitters, and malicious intrusion. As a result, the remote controller receives sensed or feedback signals 2112*c*, and the switch device receives the remote control packet 2211 after a period of time. The received remote control packet 2212 at the switch device side could contain nothing if the packet 2211 is lost.

A local controller 2203 generates a local control command 2213 $u_l(k)$ by adopting a local control policy and using the feedback signal 2112 from sensors 2104. The switch device 2202 submits the control command 2113 to actuators 2102 according to the reception status of the remote control packet 2211. The actuators 2102 enable the actual control 2114 of the plant changing the state of the plant measured by the sensors 2104.

In some embodiments, the local controllers receives the reference 2111 locally as shown in FIG. 2A. In another embodiment, the local controllers infer the reference from the received control packet 2212. These scenarios can be enabled by packaging different information into the remote control packet. For example, in order to enable FIG. 2B, the remote control packet should include the remote control command as well as the reference signal 2111.

In some embodiment, the remote controller adopts policies tackling optimality, uncertainties, and constraints, e.g. model predictive control, reinforcement learning, and adaptive dynamic programming. The local controller implements computationally lightweight policies for closed-loop system stability, for instance, proportional integral and derivative control (PID).

Figure 2C:
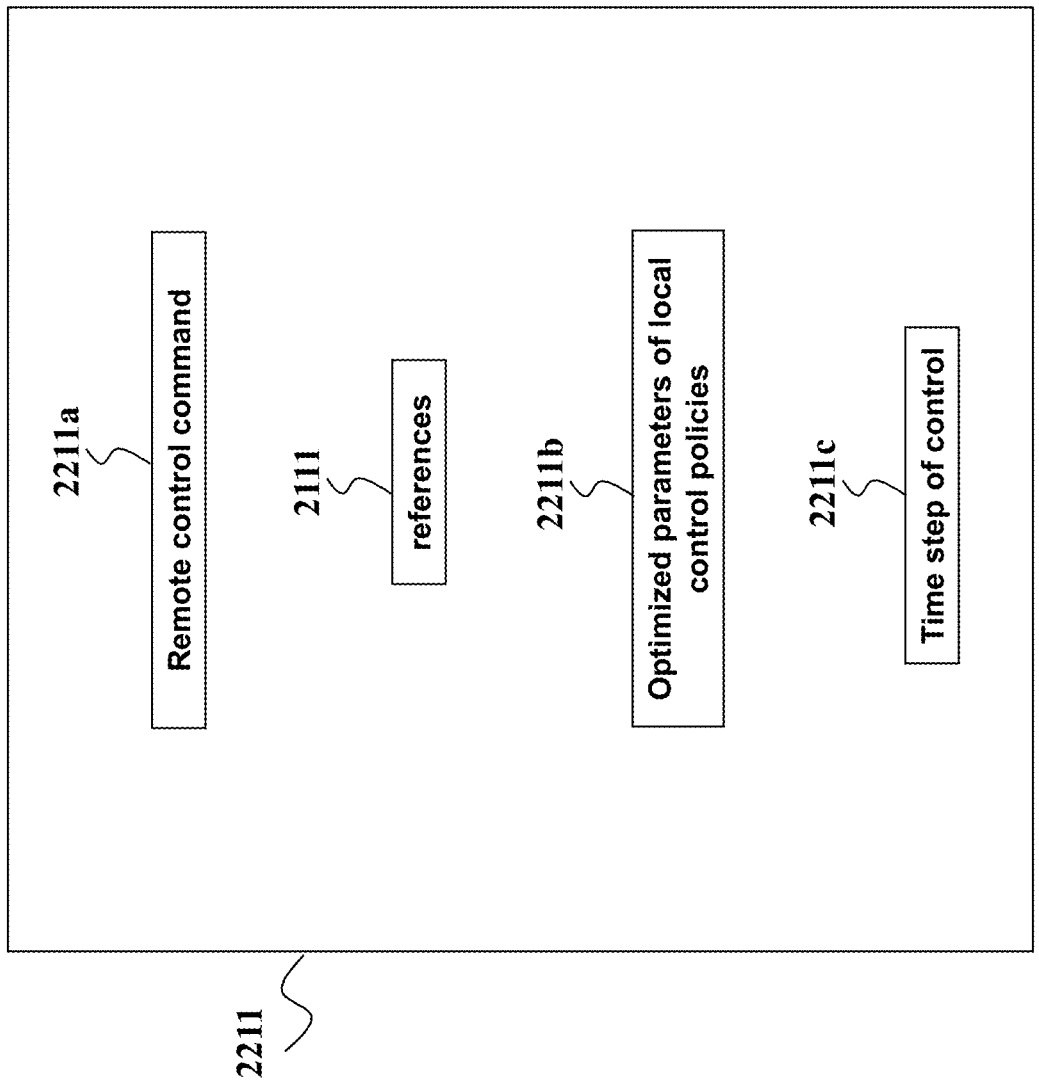
FIG. 2C shows a structure of a remote control network packet according to some embodiments.

FIG. 2C shows a structure of a remote control network packet 2211 according to some embodiments. As shown in FIG. 2C, the remote control packet can include a remote control command $u_r(k)$ 2211*a*. In some embodiment, the remote controller implements a learning mechanism which optimizes parameters of the local controller based on the feedback signal 2112*c* and the reference 2111. Various reinforcement learning implementations can be utilized to perform parameter optimization. For example, approximate and adaptive dynamic programming techniques can be exploited to optimize parameters of local control policies in a reliable manner.

As an example, consider a plant model as follows $x(k+1)=f(x(k))+g(x(k))u(k)$, where k is time step, x(k) is plant state, f, g are vectors of smooth functions, u is control input. Also assume the local controller implements an initial local control policy $u_{l0}(x)$, and define a stage cost $l(x(k), u(k))$, with l a smooth function. Remote controller can run online policy iteration procedure as follows to determine an improved local control policy and send the improved local control policy to the local controller: for j=0, 1, . . . .
1. Policy evaluation step: determine a vector of parameters $W_{j+1}$ satisfying $W_{j+1}(\phi(x(k))-\phi(x(k+1)))=l(x(k), u_{lj}(k))$ where $\phi(x)$ is a pre-defined vector of smooth functions.
2. Policy improvement step: determine the improved local control policy $$u_{j+1}(k) = \operatorname*{argmin}_u(l(x(k), u) + W_{j+1}\phi(x(k+1))).$$

To that end, in one embodiment, at least one remote control command includes at least one parameter 2211*b* of the local control policy, and the local controller is configured to update the local control policy upon receiving the parameter. Additionally, or alternatively, in some embodiments, the remote control network packet 2211 includes identification of the time step of control 2211*c* for the remote control command. The time step of control 2211*c* can be time stamp of network transmission, an order number and/or a time instance of sampling, transmitting of receiving a sample of feedback signal for which the remote control command is determined, automatic number generator, e.g., sequence number or random number, synchronized with generator at the local controller, and combination thereof. It should be noted that all these techniques are used to determine a correspondence between remote and local control commands. Regardless of technique, the correspondence is established for the sample of feedback signal, i.e., the corresponding local and control commands are determined for the same sample of control signal referred here as a sample at an instance of time.

Figure 3:
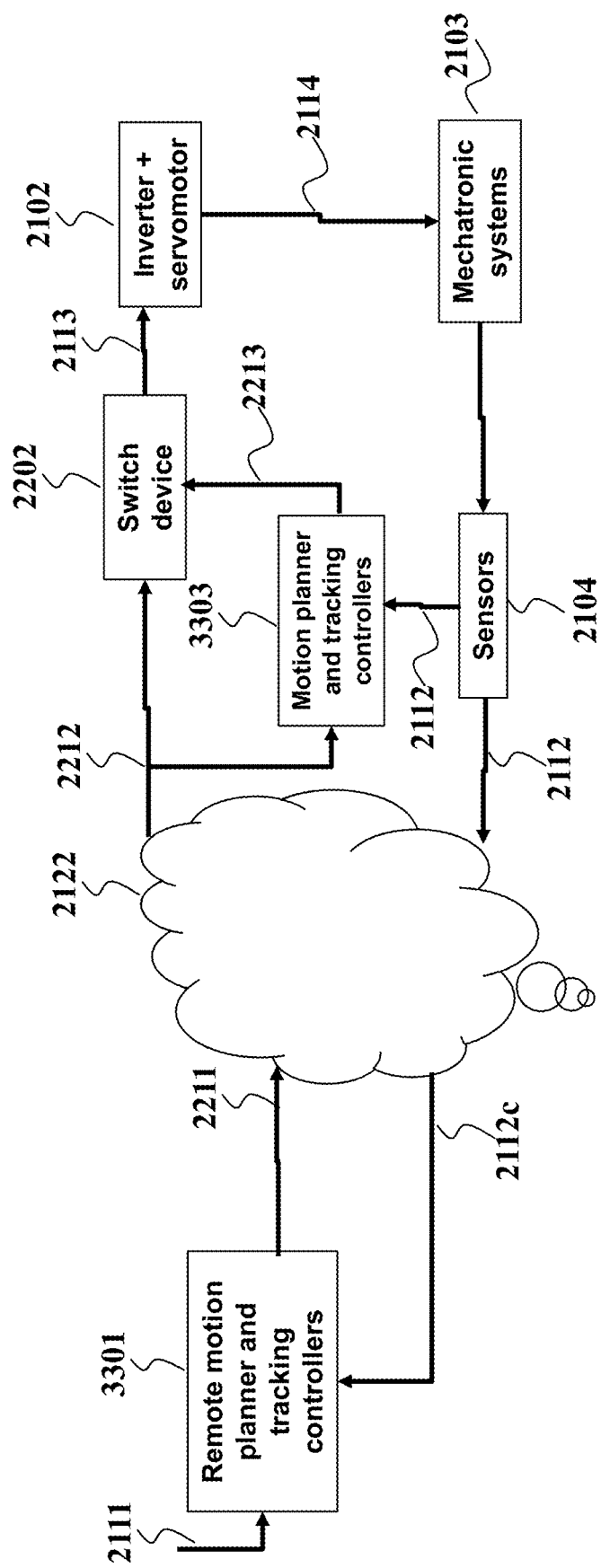
FIG. 3 shows an example of NCS architecture applied to mechatronic systems according to some embodiments.

FIG. 3 shows an example of NCS architecture applied to mechatronic systems according to some embodiments. Consider a mechatronic system, e.g. a multi joint robot arm, performing a pick and place task. Its dynamics are represented as a nonlinear discrete-time system, $$x(k+1)=f(x(k),u(k)),$$

$$y=\psi(x),$$

where k is a time step, $x \in \mathbb{R}^n$ is the state, $u \in \mathbb{R}^m$ the control 2113, y is sensed output, and f, ψ are smooth functions. The state includes angles and angular velocities of joints, as well as the position and velocity of the end-tip of the robot arm, whereas the control u includes torques generated by motors mounted on the joints. The sensed output 2112 contains angles of all joints or the associated motors.

As shown in FIG. 3, the local controller 3303 implements not only motion planning but also tracking control policy $u_l(k)=h(x_l(k))$. The motion planning portion, with the pick and place coordinates, and task time as reference inputs, computes a local position or velocity trajectory for the robot arm to track; and the tracking control portion determines local control commands to inverter and servomotor (actuators). The remote controller 3301 uses remote motion planning and tracking controllers, wherein the former compute a remote position or velocity trajectory, and the latter determine remote control commands. Note that due to limited computation power of the platform where the local controller is deployed, the motion planning of the local controller typically generates a time-optimal trajectory, which is lack of energy efficiency. Instead, the remote controller, residing on a powerful computer or even at cloud computer, can determine a trajectory according to a plethora of specifications, for instance, energy optimality.

In another embodiment, the mechatronic system can be computer numerical control machine performing complex milling tasks, or even as simple as a servomotor performing point to point (straight-line) positioning tasks.

In some embodiment, the network 2122 is wired, for instance, Ethernet or various industrial automation networks. In some embodiment, the network 2122 is wireless such as WiFi, ISA100, WirelessHART, and ZigBee.

Figure 4:
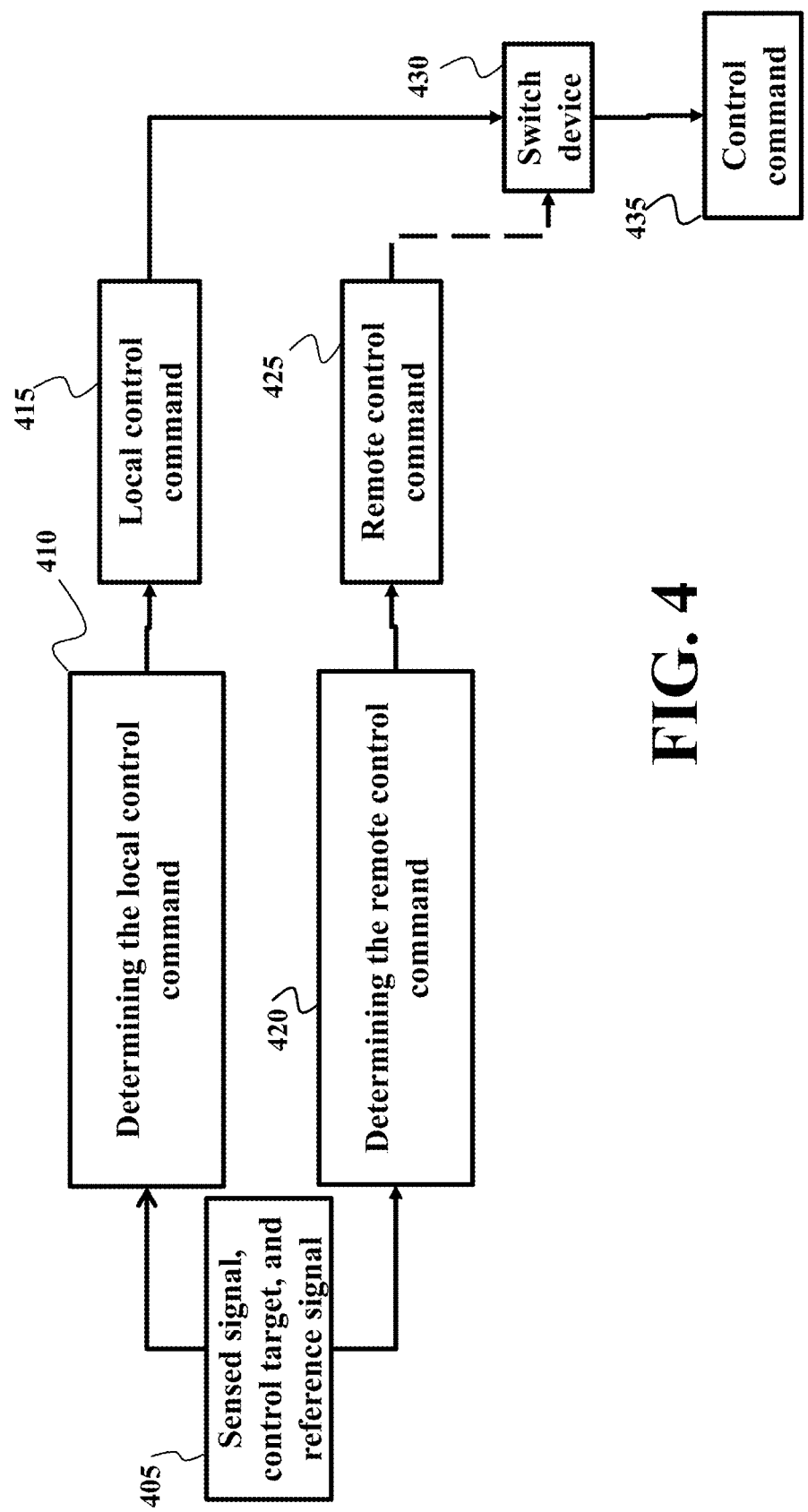
FIG. 4 shows a method for coordinating local and remote control commands according to some embodiments.

FIG. 4 shows a method for coordinating local and remote control commands according to some embodiments. Based on real-time data 405 including sensed feedback signal, control objective, and/or control reference, both local controller and remote controller determine 410/420 the local control command 415 and remote control command 425, respectively. In some implementations, the local control command and the remote control command for the same time step of control are determined based on the same sample of a feedback signal from sensors measuring a state of the plant.

The local control command 415 is always (very likely) delivered to the switcher 430, whereas the remote control command 425 is not always delivered (denoted by dash line). The switcher 430 determines the control command 435 to actuators. The control command 435 is either the remote control command 425 for the time step of control, if the remote control command for the time step of control is successfully received, or the local control command 415 for the same time step of control.

Figure 5A:
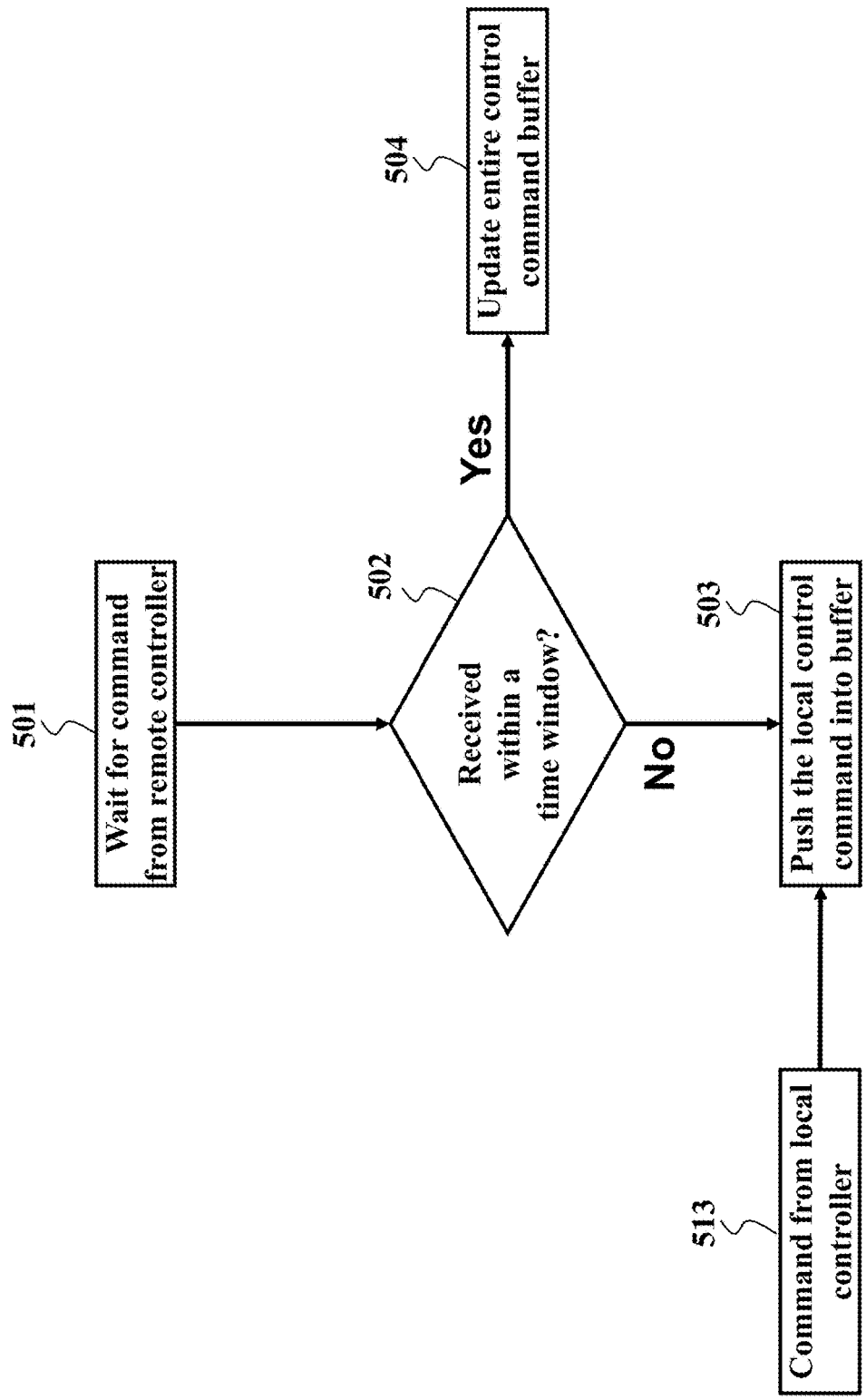
FIG. 5A shows a schematic of updating a buffer of the control system according to some embodiments.

FIG. 5A shows a schematic of updating a buffer of the control system according to some embodiments. With remote and local control policies being determined offline and deployed in real-time, at every time step k, the switcher needs to select the control command for the actuators. In some embodiments, the remote controller is a predictive controller and the remote control command includes a sequence of remote control commands for a time horizon. This embodiment packs the sequence of control commands into a single network packet to increase network throughout. In addition, in some implementations, the switcher places the entire sequence of commands in the buffer upon successfully receiving the sequence of commands from the remote controller. These embodiments prioritize remote control commands over local control commands even if the local control command is determined based on latest sample of the feedback signal. In effect, these embodiments allow to take advantage of more accurate/performance-oriented predictive control of the remote controller even if some of the packets are lost during the network transmission.

For example, in one embodiment according to FIG. 5A, the switcher waits 501 for the remote control packet. In case that the remote control packet is received within a time window before the time of execution of the control command, the switcher updates 504 a control command buffer; otherwise, the switcher updates the control command buffer 503, based on the local control command 513. In some embodiments, the switcher prioritizes unsubmitted remote control commands in the buffer over corresponding local control commands. Specifically, a remote control command determined for a future control step is replaced in the buffer only with a remote control command determined for the same control step based on more recent sample of a feedback signal from sensors measuring a state of the plant. In other words, the remote control command determined for a future control step is not replaced in the in the buffer with a local control command determined for the same control step based on more recent sample of a feedback signal. In effect, these embodiments allow to take advantage of more accurate predictive control of the remote controller even if some of the packets are lost during the network transmission.

In some embodiments, at every time step k, the switch device maintains a time window $T_k$. If no arrival of the remote reception of the remote control packet happens within $T_k$, the switch device conducts 503. On the contrary, upon the reception of the remote control packet, the switch device retrieves the transmission time stamp of the remote control packet, and checks if the transmission time stamp falls inside the time window $T_k$. If yes, the kth remote control packet arrives on time, and the switch device performs the update 504; otherwise, the switch device performs the update 503.

Figure 5B:
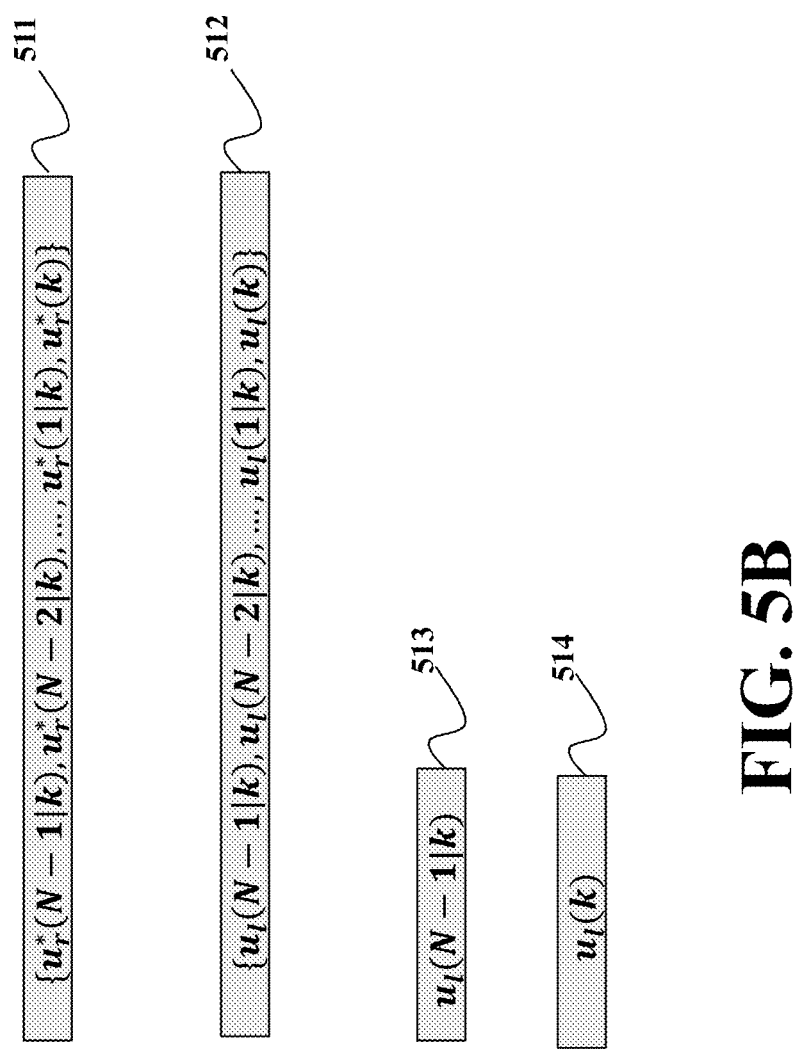
FIG. 5B, FIG. 5C, and FIG. 5D show exemplar scenarious of buffer update of FIG. 5A.
Figure 5C:
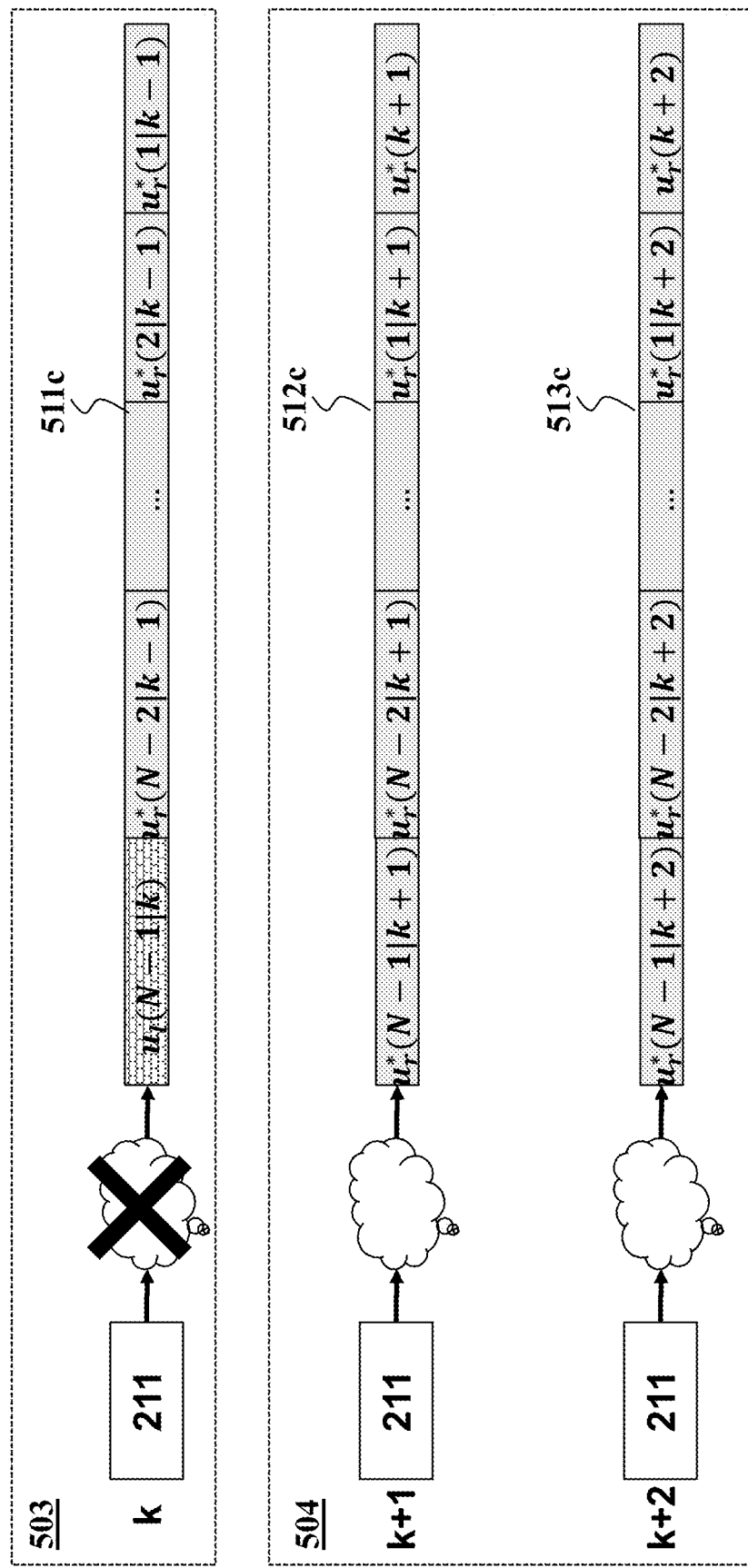
Figure 5D:
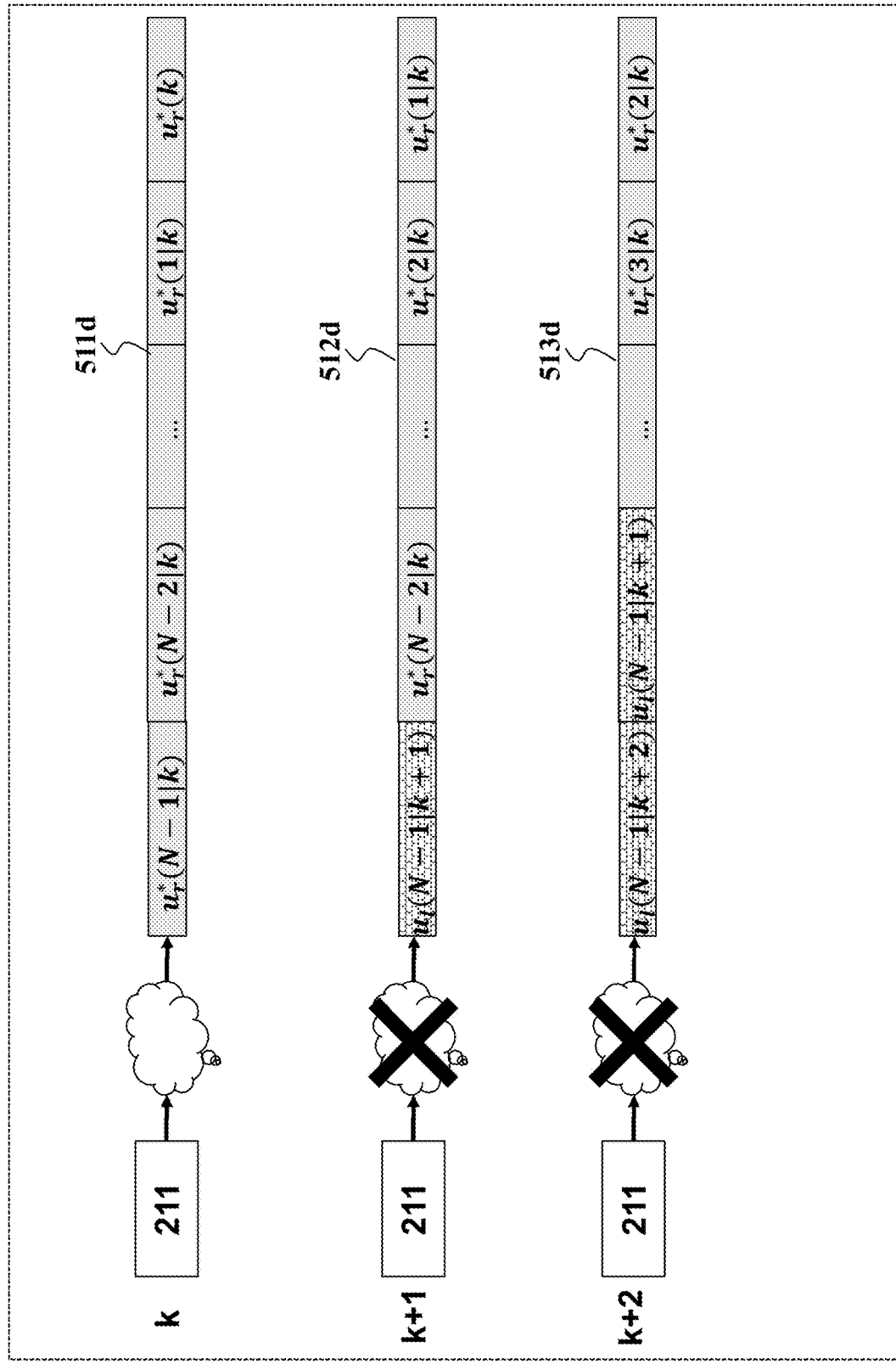

FIG. 5B, FIG. 5C, and FIG. 5D show examplar scenarious of buffer update of FIG. 5A. FIG. 5B shows data structures of the remote control command 511 and local control command 512/513/514 according to some embodiments. In these embodiments, the remote controller solves a model predictive control problem over a pre-selected time horizon N, which, at each time step k, yields a sequence of remote control commands $$u^*_r(k)=\{u^*_r(N-1|k), \ldots, u^*_r(1|k), u^*_r(k)\},$$

where $u^*_r(k)$ is supposed to command the actuator at time k, and $u^*_r(i|k)$ is supposed to command the actuator at time k+i. Similarly, the locally control policy also implements prediction, and generates a sequence of local control command 213a $$u_l(N-1|k), \ldots, u_l(1|k), u_l(k).$$

In another embodiment, the local control policy also incorporates prediction, and thus generates a local control command $u_l(N-1|k)$ 513, which is supposed to command the actuator at time k+N-1.

In some embodiment, the local control policy does not incorporate any prediction, and thus generate a local control command $u_l(k)$ 514, which is supposed to command the actuator at time k. In this case, the switch device needs to track when the local control command is needed and poll the local controller for the local control command at the specified time step.

FIG. 5C shows examplar update 503/504 for a scenario that corresponds to the case when the switcher initially does not receive the remote control packet within the time window, but later receives two remote control packets consecutively. The local controller generates a sequence of local control commands. Assume that the control command buffer of the switch device, at time k-1, stores a sequence of remote control commands $$u^*_r(k-1)=\{u^*_r(N-1|k-1), \ldots, u^*_r(k-1)\}$$

At k step, the remote control packet 2211 is lost. The switch device then pushes 503 the local control command $u_l(N-1|k)$ into the control command buffer which gives the data 511c. This is important to ensure stability of the closed-loop control system. If at time step k+1, the remote control packet containing remote control command sequence $$u^*_r(k+1)=\{u^*_r(N-1|k+1), \ldots, u^*_r(1|k+1), u^*_r(k+1)\}$$

is received within the time window by the switch device, then the switch device updates 504 the control command buffer as 512c with the remote control command sequence $u^*_r(k+1)$. Similarly, if at time step k+2, the remote control packet containing the remote control command sequence $$u^*_r(k+2)=\{u^*_r(N-1|k+2), \ldots, u^*_r(1|k+2), u^*_r(k+2)\}$$

is received on within the time window by the switch device, then the switch device updates 504 the control command buffer as 513c with the latest remote control command sequence $u^*_r(k+2)$.

FIG. 5D shows a schematic illustrating actions of the switcher in another examplar scenario. Without loss of generality, assume that the control command buffer of the switch device, at time k-1, stores a sequence of remote control commands $u^*_r(k-1)=\{u^*_r(N-1|k-1), \ldots, u^*_r(k-1)\}$.

At time step k, the remote control packet arrives at the switch device within its specified time window. Then the switch device updates 504 the control command buffer with the latest remote control command $u^*_r(k)=\{u^*_r(N-1|k), \ldots, u^*_r(k)\}$.

At time step k+1, the remote control packet is lost, then the switch device pushes the local control command $u_l(N-1|k+1)$ into the control buffer as 512d; furthermore, at time step k+2, the remote control packet is lost again, and the switch device pushes the local control command $u_l(N-1|k+2)$ into the control command buffer as 513d.

Some embodiments are based on realization that to simplify the design of the local and remote controller having joint stability, the remote control policy needs to be adapted for the local control policy, and not vice versa. This is because the remote control policy is usually more sophisticated that the local control policy. Some embodiments are based on another realization that a single control policy can have multiple Lyapunov functions having a negative definite time derivative. Thus, for the same control policy, it is possible to design a Lyapunov function having a tunable parameter that can be tuned based on another control policy.

Figure 6A:
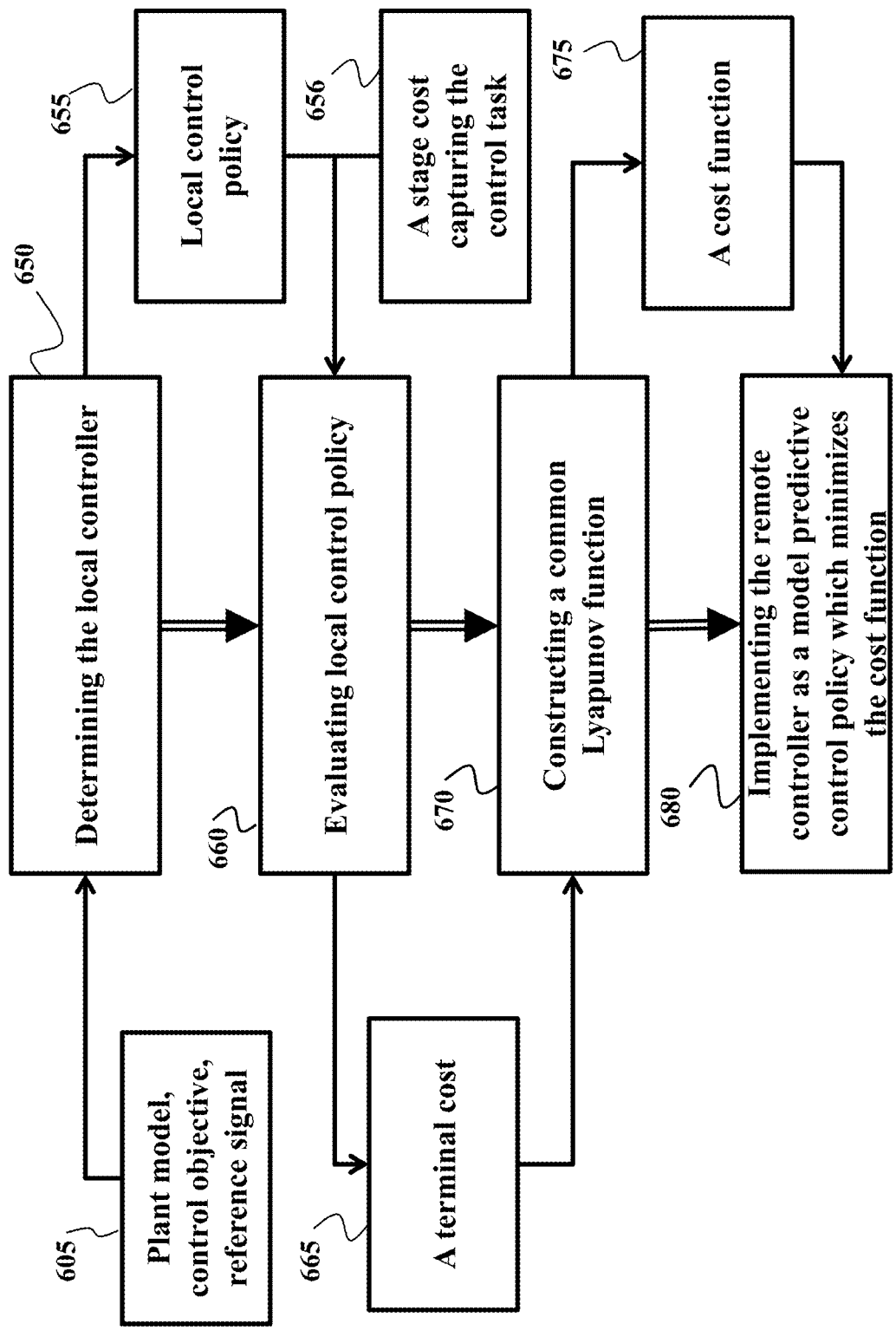
FIG. 6A shows a block diagram of a method for designing local and remote control policies jointly according to one embodiment.

FIG. 6A shows a block diagram of a method for designing local and remote control policies jointly according to one embodiment. The joint design of the local controller and remote controller in performed a manner such that the resultant closed-loop control system maintains stability, as well as outperforms a baseline closed-loop control system where only the local controller is deployed. The embodiment first determines 650 a local control policy 655. For example, the local control policy can be determines based on knowledge 605 of a plant model, control target, and reference signal. For example, the control objective could be to track a reference signal.

In some embodiment, the control objective is to enforce the plant output follows a constant reference; in another embodiment, the control objective is to enforce to plant output tracks a time-varying reference (trajectory) as close as possible. In some embodiment, the control objective is to stabilize the plant state, i.e. enforcing x goes to some constant value (equilibrium) as time goes to infinity. In addition to specifying desired output or plant states in the control objective, it is possible that energy consumption and time for the task to finish are also incorporated in the control target.

The embodiment evaluates 660 local control policy 655 to produce a terminal cost 665 for the remote control policy. For example, for a model predictive control, a Lyapunov function is a cost function including a terminal cost 665 and summing a stage cost 656 over a prediction horizon. While the stage cost depends on the plant, the terminal cost includes a terminal matrix that can be tuned based on the local control policy. The stage cost is a cost of remote control at each control step. The stage cost can be selected by a controller designer based on trading off control efforts of the controller and the system performance. The terminal cost 665 specifies desired state of the controlled plant caused by the remote controller.

In some embodiments, the remote controller is a predictive controller determining a sequence of control commands over a prediction horizon. In these embodiments, the terminal costs specifies desired state of the controlled plant caused by the remote controller at the end of the prediction horizon. The terminal cost is a function of a state of the plant selected such that change of the state of the plant controlled by the local control policy decreases the terminal cost at the rate faster than the stage cost. In some embodiments, to select such a function of the state defining the terminal cost, the embodiments solve a partial differential equation describing the relationship of the state of the plant, the stage cost, and the local control policy.

The terminal cost and the stage cost are used to construct 670 a common Lyapunov function, which is equivalent to determining a cost function 675 for the remote controller to optimize. Finally, the remote controller implements 680 the remote control policy as a model predictive control which minimizes the cost function 675 over a certain time horizon N.

In some embodiment, the stage cost is simply defined as a smooth and positive definite function $l(x(k), u(k))$ of state x and control u, where positive definiteness means $l(x(k), u(k))>0$ for any $x(k), u(k)\neq 0$. In some embodiment, the stage cost is a quadratic function of $x(k)$ and $u(k)$. In some embodiment, the stage cost is written as follows $l(x,u)=x^T(k)Qx(k)+u^T(k)Ru(k)$ where Q and R are positive definite matrices.

To that end, the problem of designing jointly stable controllers are reducing to a selection or optimization problem of how to select a tunable parameter of Lyapunov function of remote control policy such that the tuned Lyapunov function is also a Lyapunov function of a local control policy. Some embodiments solved this problem by evaluating the remote Lyapunov function of the remote control policy along a system trajectory corresponding to the local control policy to produce a value of a tunable parameter of the remote Lyapunov function.

Figure 6B:
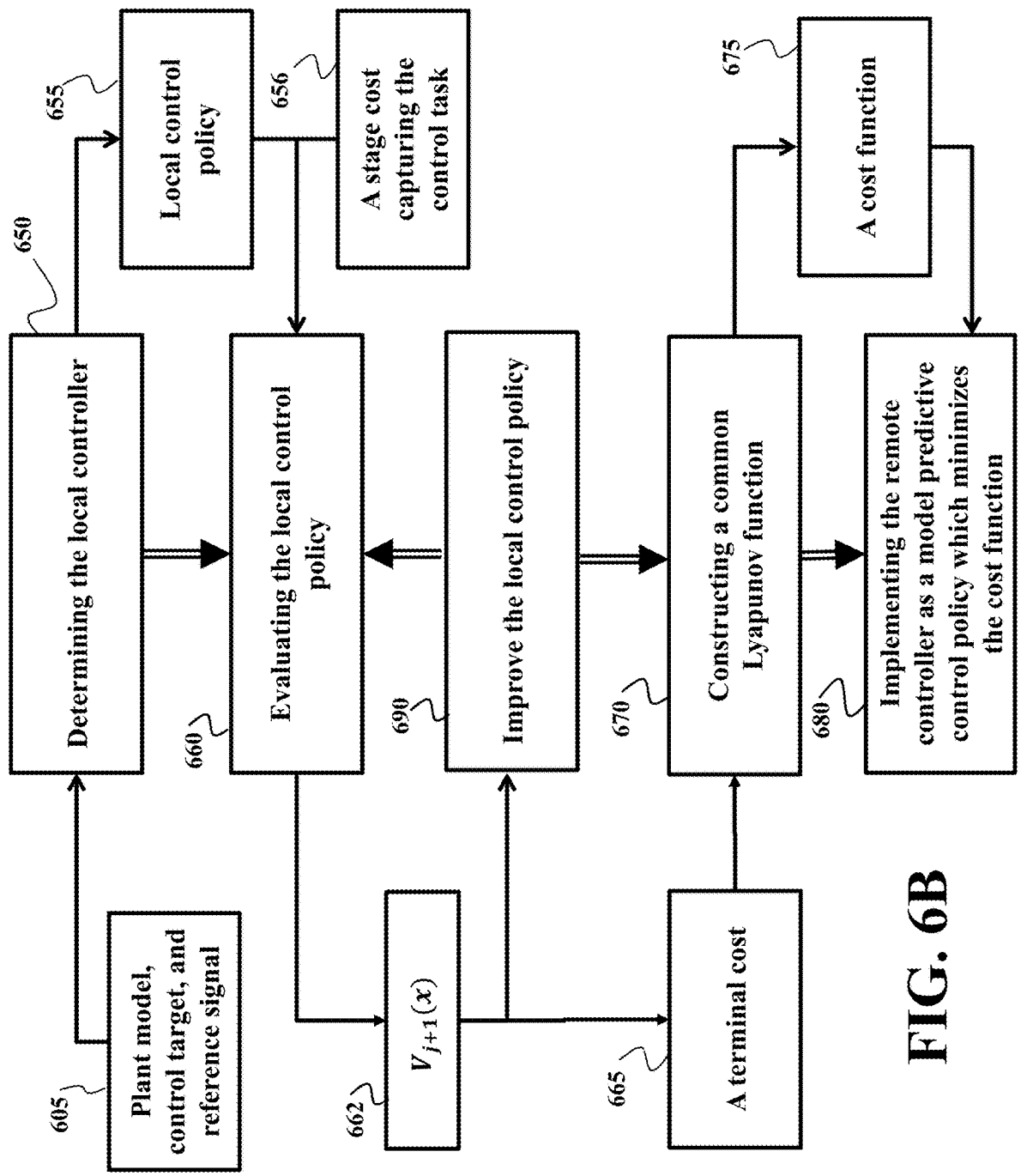
FIG. 6B shows a block diagram of a method for determining remote model predictive control (MPC) policy according to one embodiment.

FIG. 6B shows a block diagram of a method for determining remote model predictive control (MPC) policy according to one embodiment. This can be advantageous because MPC, by taking constraints and optimality into account, is in alignment with desired features of the remote controller.

In some embodiment, the plant state is measured, i.e, y=x. In another embodiment, the plant state can be inferred from y, even if the dimension of y is lower than x. This is possible for various engineering systems when the systems hold 'so-called' detectability. For teaching purpose, this invention considers a plant modeled by the following nonlinear discrete-time system $x(k+1)=f(x(k))+g(x(k))u(k)$ $y(k)=x(k),$ (1)

where $x \in \mathbb{X} \subset \mathbb{R}^n$ is the state, f and g smooth vector fields, $u \in \mathbb{U} \subset \mathbb{R}^m$ the control input, and y the output. Both $\mathbb{X}$ and $\mathbb{U}$ are convex and compact, with each set containing the origin in its interior. The control objective is to steer states to the origin x=0 while minimizing a certain cost function. The cost function needs to be designed according to local control policy to ensure stability and performance.

Regarding the plant, the following assumptions are imposed to facilitate stability analysis and control design:
1. there exists an MPC and a local state feedback control policy $u_l(k)=h(x(k))$ to achieve control target in the presence of an ideal network;
2. the plant model is known, and the plant states are measured or can be reconstructed in a reliable manner from sensed signals and the plant model.

The remote and local control policies for the plant (1) are jointly designed to ensure that the resultant closed-loop system is semi-globally asymptotically stable.

a. Let x=0 be an equilibrium for the closed-loop system (1) with control $u_l(k)=h(x(k))$. There exists a continuously differentiable function $V_l: \mathbb{R}^n \to \mathbb{R}$ such that
1. $V_l(0)=0$ and $V_l(x)>0$, $\forall x \neq 0$
2. $\|x\| \to \infty \Rightarrow V_l(x) \infty$
3. $V_l(x(k+1))-V_l(x(k))<0$, $\forall x \neq 0$.

Several control designs lead to blacku$_l(k) \in \mathbb{U}$, $\forall x \in \mathbb{X}$, and blacku$_l(k)$ renders $\mathbb{X}$, an invariant set of the control system. For simplicity, this invention assumes that $u_l(k)$ always lies in $\mathbb{U}$ for all $x \in \mathbb{X}$, and makes $\mathbb{X}$ an invariant set.

Without loss of generality, for the plant (1) at time step k, the remote controller 201 implements the MPC control policy by minimizing the following cost function 675

$$V(x(k),u(k))=F(x(N|k))+\Sigma^{N-1}_{i=0}l(x(i|k),u(i|k)), \quad (2)$$

where $F(x(N|k)$ is a terminal cost 665 to be determined, $l(x, u)$ is a given stage cost 656 to balance plant state and control efforts during the closed-loop system transience, and $$u(k)=\{u_r(k),u_r(1|k),\ldots,u_{br}(N-1|k)\},$$

$x(i|k)$ for $1 \leq i \leq N-1$ is the state corresponding to $u_r(k)$, and N the prediction horizon. Both $l(x, u)$ and $F(x)$ are positive definite. At time step k, the remote MPC controller solves an optimization problem by minimizing the cost function (2), subject to state/control constraints along the state trajectory and a terminal constraint $x(N|k) \in \mathbb{X}_f \subset \mathbb{X}$.

The existence of a local control policy to stabilize the plant implies that the optimization problem has an optimal solution: at time step k $$u^*_r(k)=\{u^*_r(k),u^*_r(1|k),\ldots,u^*_r(N-1|k)\};$$

and the associated cost function is given by $V^*_r(x(k))=V(x(k), u^*_r(k))$ as well as a common Lyapunov function. In one embodiment, this invention
1. determine the terminal cost by an iterative procedure which solves a set of partial different equations;
2. show $V^*_r(x(k))$ is a common Lyapunov function when the switch device updates its control command buffer 503 and/or 506 according to the reception status of the remote control packet.

Given a local control policy $u_l(k)=h(x(k))$ rendering the plant (1) globally asymptotically stable, this invention realizes that as long as one can find a certain positive definition function $J(x)$ satisfying the following condition: for $0 \leq k < \infty$, $\forall x \in \mathbb{X}$, $\alpha \geq 1$, $$\alpha \cdot (l(x(k),u_l(k)))+J(x(k+1))-J(x(k))=0, \quad (3)$$

then the cost function (2), with $F(x)=J(x)$ and the stage cost $l(x, u)$, is a common Lyapunov function of the closed-loop system, where control input switches between the MPC policy and $u_l(k)=h(x(k))$.

One implementations employs the following 1-step policy evaluation-based procedure which 660 evaluates $u_l=h(x)$ to construct a terminal cost $J(x)$:
1. Design 650 a stabilizing local controller $u_{l0}=h_0(x)$.
2. Evaluate 660 the local control policy, where given $u_{l0}=h_0(x)$, $l(x, u)$, $0<\gamma \leq 1$, the following policy evaluation is performed for $j=0$ $$V_{j+1}(x(k))=l(x(k),h_j(x(k)))+\gamma V_{j+1}(x(k+1)). \quad (4)$$

3. Record the cost $V_1(x)$ corresponding to $u_{l0}=h_0(x)$, and let $J(x)=V_1(x)$.
4. Define a cost function 675 as (2) with $F(x)=J(x)=V_1(x)$.
5. Implement 680 the remote controller as an MPC policy by minimizing the cost function.

Given a local control law $u_l=u_{l0}$, the policy evaluation-based co-design procedure eventually outputs a terminal cost $J(x)=V_1(x)$ with $J(x(k+1))-J(x(k))=-l(x(k), u_l(k))$ according to (4), which implies the satisfaction of condition (3). Therefore the closed-loop control system is semi-globally asymptotically stable.

As a system of first-order nonlinear difference equations, the closed-form solution of (4) is difficult to establish. Instead, a proper approximate solution is usually of practical interest. Given $u_l=h(x)$ and parameterizations of $J(x)$, (4) is reduced to algebraic equations, and thus, the approximate solution of $J(x)$ can be readily computed.

The local control policy $u_l=h(x)$ is designed to make $V_l$ decay along the closed-loop system trajectory. This implies that $u_{l0}$ may be far from optimal w.r.t., minimizing the cost function (2). As a consequence, the terminal cost $V_1$ might not be good which necessarily compromises the performance of the remote controller.

A remedy to this issue is to introduce policy iteration-based co-design procedure as shown in FIG. 6B, which is also elaborated as follows:
1. Design 650 a stabilizing controller 650 $u_{l0}=h_0(x)$ and let $j=0$.
2. Evaluate 660 the local control policy 655, where given $u_{lj}=h_j(x)$ and $l(x, u)$, perform the policy evaluation step (4) to evaluate the cost $V_{j+1}(x)$ 662 corresponding to the control $u_{lj}$ for $j=0, 1, \ldots$
3. Improve local control policy 690, where given $V_{j+1}(x)$, perform policy improvement step:

$$h_{j+1}(x(k)) = \underset{h(.)}{\operatorname{argmin}}(l(x(k), h_j(x(k))) + \gamma V_{j+1}(x(k + 1))). \quad (5)$$

4. Let $j=j+1$ and repeat the policy evaluation and policy improvement steps until $j=M$ or $|V_{J+1}-V_j| \leq \varepsilon \ll 1$
5. Record the cost $V_M(x)$ corresponding to $u_{lM}=h_M(x)$, and let the terminal cost 675 $F(x)=J(x)=V_M(x)$; or record the cost $V_{j+1}(x)$ corresponding to $u_{lj+1}=h_{j+1}(x)$ and let the terminal cost 675 $F(x)=J(x)=V_{j+1}(x)$
6. Define a cost function 675 as (2) with $F(x)$.
7. Implement 680 the remote controller as an MPC policy by minimizing the cost function (2).
8. The local controller implements the local control policy $u_{lM}=h_M(x)$ or $u_{lj+1}=h_{j+1}(x)$ depending on at what j the policy evaluation stops.

The policy iteration-based co-design procedure can be implemented offline to design local control policy. In another embodiment, it can be implemented in the remote controller to improve the local control policy online.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A control system for controlling a plant, comprising:
   a local controller configured to generate local control commands according to a local control policy to control the plant;
   a receiver configured to received remote control commands generated by a remote controller to control the plant according to a remote control policy, wherein the local control policy and the remote control policy are designed for same control objective and same time resolution of controlling the plant such that there is same Lyapunov function having a negative definite time derivative for controlling the plant according to the local control policy or controlling the plant according to the remote control policy; and
   a switcher configured to switch controlling of the plant between controlling with the remote control commands and controlling with the local control commands in response to an event triggered by a change in a success of receiving a remote control command for a time step of control.

2. The control system of claim 1, wherein the local control commands and the remote control commands are identified by time steps of control, further comprising:
   a buffer configured to store a sequence of control commands for controlling the plant over a sequence of control steps, wherein a control command for the time step of control is either a remote control command for the time step of control or a local control command for the time step of control; and
   a control interface configured to submit the control command stored in the buffer for the time step of control to an actuator of the plant for controlling the plant at the time step of control;
   wherein the switcher is configured to place in the buffer the remote control command for the time step of control upon successfully receiving the remote control command for the time step of control, and, otherwise, place in the buffer the local control command for the time step of control.

3. The control system of claim 2, further comprising:
   a feedback transmitter configured to transmit a feedback signal from the plant to the local controller and to the remote controller, wherein each sample of the feedback signal includes data indicative of a state of the plant at an instance of time, wherein the remote and the local controllers determine the remote and the local control commands for the same time step of control based on the same sample of the feedback signal.

4. The control system of claim 3, wherein the feedback transmitter marks the sample of the feedback signal at the instance of time with an indication of the instance of time, wherein the remote and the local control commands determined based on the sample of the feedback signal include the indication of the instance of time.

5. The control system of claim 2, wherein the remote controller is a predictive controller, wherein the remote control command includes a sequence of remote control commands for a time horizon, wherein the switcher places the entire sequence of commands in the buffer upon successfully receiving the sequence of commands from the remote controller.

6. The control system of claim 5, wherein the switcher prioritizes unsubmitted remote control commands in the buffer over corresponding local control commands, such that a remote control command determined for a future control step is replaced in the buffer only with a remote control command determined for the same control step based on more recent sample of a feedback signal from sensors measuring a state of the plant.

7. The control system of claim 2, wherein the buffer includes only one control command, wherein the local controller generates a single local control command for a single instance of the feedback signal, and wherein the switcher prioritize the remote control command over the corresponding local control command.

8. The control system of claim 1, wherein the local control command and the remote control command for the same time step of control are determined based on the same sample of a feedback signal from sensors measuring a state of the plant.

9. The control system of claim 8, further comprising:
   a buffer configured to store a control command for the time step of control, wherein control command is either the remote control command for the time step of control, if the remote control command for the time step of control is successfully received, or the local control command for the same time step of control; and
   a control interface configured to submit the control command stored in the buffer for the time step of control to an actuator of the plant for controlling the plant at the time step of control.

10. The control system of claim 1, at least one remote control command includes at least one parameter of the local control policy, wherein the parameter is determined according to online policy iteration procedure and the local controller is configured to update the local control policy upon receiving the parameter.

11. The control system of claim 1, wherein the remote control policy is different from the local control policy.

12. The control system of claim 1, wherein the remote controller is an optimization controller, wherein the local controller is an analytic controller.

13. The control system of claim 1, wherein the Lyapunov function of the remote control policy has a tunable parameter selected based on the local control policy.

14. The control system of claim 13, wherein the tunable parameter is selected by evaluating the Lyapunov function of the remote control policy along a trajectory of the plant controlled by to the local control policy.

15. The control system of claim 1, wherein the remote controller is a model predictive controller, wherein the second control policy is different from the first control policy.

16. The control system of claim 15, wherein a terminal cost of a cost function minimized by the model predictive controller is a function of the local control policy of the local controller.

17. The control system of claim 16, wherein the terminal cost is a solution of a partial differential or difference equation of the local control policy.

18. A method for controlling a plant, wherein the method uses a processor coupled with stored instructions implementing the method, wherein the instructions, when executed by the processor carry out steps of the method, comprising:

generating local control commands according to a local control policy to control the plant, wherein the local control commands are identified by time steps of control;

receiving, over a network, remote control commands generated by a remote controller to control the plant according to a remote control policy, wherein the remote control commands are identified by the time steps of control, and wherein the local control policy and the remote control policy are designed for same control objective and same time resolution of controlling the plant such that there is same Lyapunov function having a negative definite time derivative for controlling the plant according to a first control policy or controlling the plant according to a second control policy;

selecting a control command for controlling the plant for a time step of control, wherein the control command for the time step of control is either a remote control command for the time step of control, when the remote control command for the time step of control is received over the network, or a local control command for the time step of control; and submitting the control command selected for the time step of control to an actuator of the plant for controlling the plant at the time step of control.

19. The control method of claim 18, wherein the local control command and the remote control command for the same time step of control are determined based on the same sample of a feedback signal from sensors measuring a state of the plant.

20. A non-transitory computer readable storage medium embodied thereon a program executable by a processor for performing a method, the method comprising:

generating local control commands according to a local control policy to control the plant, wherein the local control commands are identified by time steps of control;

receiving, over a network, remote control commands generated by a remote controller to control a plant according to a remote control policy, wherein the remote control commands are identified by the time steps of control, and wherein the local control policy and the remote control policy are designed for same control objective and same time resolution of controlling the plant such that there is same Lyapunov function having a negative definite time derivative for controlling the plant according to the first control policy or controlling the plant according to the second control policy;

selecting a control command for controlling the plant for a time step of control, wherein the control command for the time step of control is either a remote control command for the time step of control, when the remote control command for the time step of control is received over the network, or a local control command for the time step of control; and submitting the control command selected for the time step of control to an actuator of the plant for controlling the plant at the time step of control.

* * * * *